United States Patent
Kuras et al.

(10) Patent No.: US 11,358,576 B2
(45) Date of Patent: Jun. 14, 2022

(54) BRAKE POWER DERATING

(71) Applicant: Caterpillar Inc., Peoria, IL (US)

(72) Inventors: Brian D. Kuras, East Peoria, IL (US); Ankit Sharma, Peoria, IL (US); Lance M. Cowper, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 339 days.

(21) Appl. No.: 16/664,064

(22) Filed: Oct. 25, 2019

(65) Prior Publication Data

US 2021/0122347 A1 Apr. 29, 2021

(51) Int. Cl.
*B60T 13/66* (2006.01)
*B60T 8/58* (2006.01)
*B60W 10/18* (2012.01)

(52) U.S. Cl.
CPC ............. *B60T 13/662* (2013.01); *B60T 8/58* (2013.01); *B60W 10/18* (2013.01); *B60W 2510/184* (2013.01)

(58) Field of Classification Search
CPC .. B60T 13/662; B60T 8/58; B60W 2510/184; B60W 10/18
See application file for complete search history.

(56) References Cited

U.S. PATENT DOCUMENTS

| | | | |
|---|---|---|---|
| 5,596,513 A * | 1/1997 | Schricker | B60T 8/172 188/264 D |
| 7,009,508 B2 | 3/2006 | Vertenten | |
| 9,428,190 B2 | 8/2016 | Weston | |
| 9,810,164 B2 | 11/2017 | Aoki et al. | |
| 2003/0216849 A1 | 11/2003 | Eckert | |
| 2006/0155447 A1 | 7/2006 | Uken et al. | |
| 2011/0054758 A1 | 3/2011 | Bae | |
| 2013/0274970 A1 | 10/2013 | Takahashi | |
| 2017/0080909 A1* | 3/2017 | Kim | B60T 17/221 |
| 2018/0065621 A1* | 3/2018 | Merkle | B60K 6/20 |
| 2020/0040956 A1 | 2/2020 | Cremona | |

FOREIGN PATENT DOCUMENTS

| | | |
|---|---|---|
| DE | 3940456 A1 | 6/1991 |
| GB | 2319636 A | 5/1998 |
| JP | 2010229910 A | 10/2010 |

* cited by examiner

*Primary Examiner* — Pamela Rodriguez
(74) *Attorney, Agent, or Firm* — Harrity & Harrity LLP

(57) ABSTRACT

A braking system is disclosed. The braking system may include a controller configured to determine a power limit for one or more brakes of a machine based on a temperature of the one or more brakes during engagement of the one or more brakes according to a commanded power. The power limit may be a power at which the temperature of the one or more brakes ceases to increase. The controller may be configured to determine a speed adjustment for the machine based on the power limit and the commanded power, and cause adjustment to a speed of the machine based on the determined speed adjustment.

20 Claims, 3 Drawing Sheets

BRAKE POWER DERATING

TECHNICAL FIELD

The present disclosure relates generally to a brake system for a machine and, for example, to brake power derating.

BACKGROUND

A machine may have a braking system that includes one or more brakes to control, decelerate, and/or stop the machine. For example, the braking system may include one or more friction brakes associated with one or more wheels, tracks, and/or the like, of the machine. In one scenario, the friction brakes may automatically engage during downhill travel of the machine to maintain a speed of the machine. The braking torque generated by the friction brakes may be dissipated in the form of heat. Accordingly, brake engagement during downhill travel may generate significant heat that can damage the brakes or cause brake failure.

In some current approaches, brake power (e.g., power dissipated at a brake) may be derated (e.g., limited to a value below a maximum power level) during downhill travel to reduce the heat that is generated. For example, some current approaches to brake power derating during downhill travel may be based on an estimated weight of a machine and a measured slope of the hill. However, this may result in overly conservative brake power derating when the machine is lighter than the estimated weight.

One attempt to select an appropriate operating gear for a vehicle is disclosed in U.S. Application Publication No. 2006/0155447 that published on Jul. 13, 2006 ("the '447 publication"). In particular, the '447 publication indicates that a control module may determine an appropriate gear for the vehicle based on an inclination of the vehicle, a payload carried by the vehicle, a brake oil temperature of the vehicle, and/or a speed of an engine of the vehicle. In addition, the '447 patent indicates that as the brake oil temperature increases, the control module may select an even lower running gear to further retard the speed of the vehicle to ease the reliance on the brakes.

The brake system of the present disclosure solves one or more of the problems set forth above and/or other problems in the art.

SUMMARY

According to some implementations, a method may include determining a power limit for one or more brakes of a machine based on a temperature of the one or more brakes during engagement of the one or more brakes according to a commanded power, the power limit being a power at which the temperature of the one or more brakes ceases to increase; determining a speed adjustment for the machine based on the power limit and the commanded power; and causing adjustment to a speed of the machine based on the determined speed adjustment.

According to some implementations, a braking system may include one or more brakes of a machine, and a controller configured to: determine a power limit for the one or more brakes based on a temperature of the one or more brakes during engagement of the one or more brakes according to a commanded power, the power limit being a power at which the temperature of the one or more brakes ceases to increase; determine a speed adjustment for the machine based on the power limit and the commanded power; and cause adjustment to a speed of the machine based on the determined speed adjustment.

According to some implementations, a machine may include one or more motors, one or more brakes, and a controller configured to: determine a power limit for the one or more brakes based on a temperature of the one or more brakes during engagement of the one or more brakes, the power limit being a power at which the temperature of the one or more brakes ceases to increase; determine a speed adjustment for the machine based on the power limit; and cause adjustment to a speed of the machine based on the determined speed adjustment.

DETAILED DESCRIPTION

Figure 1:
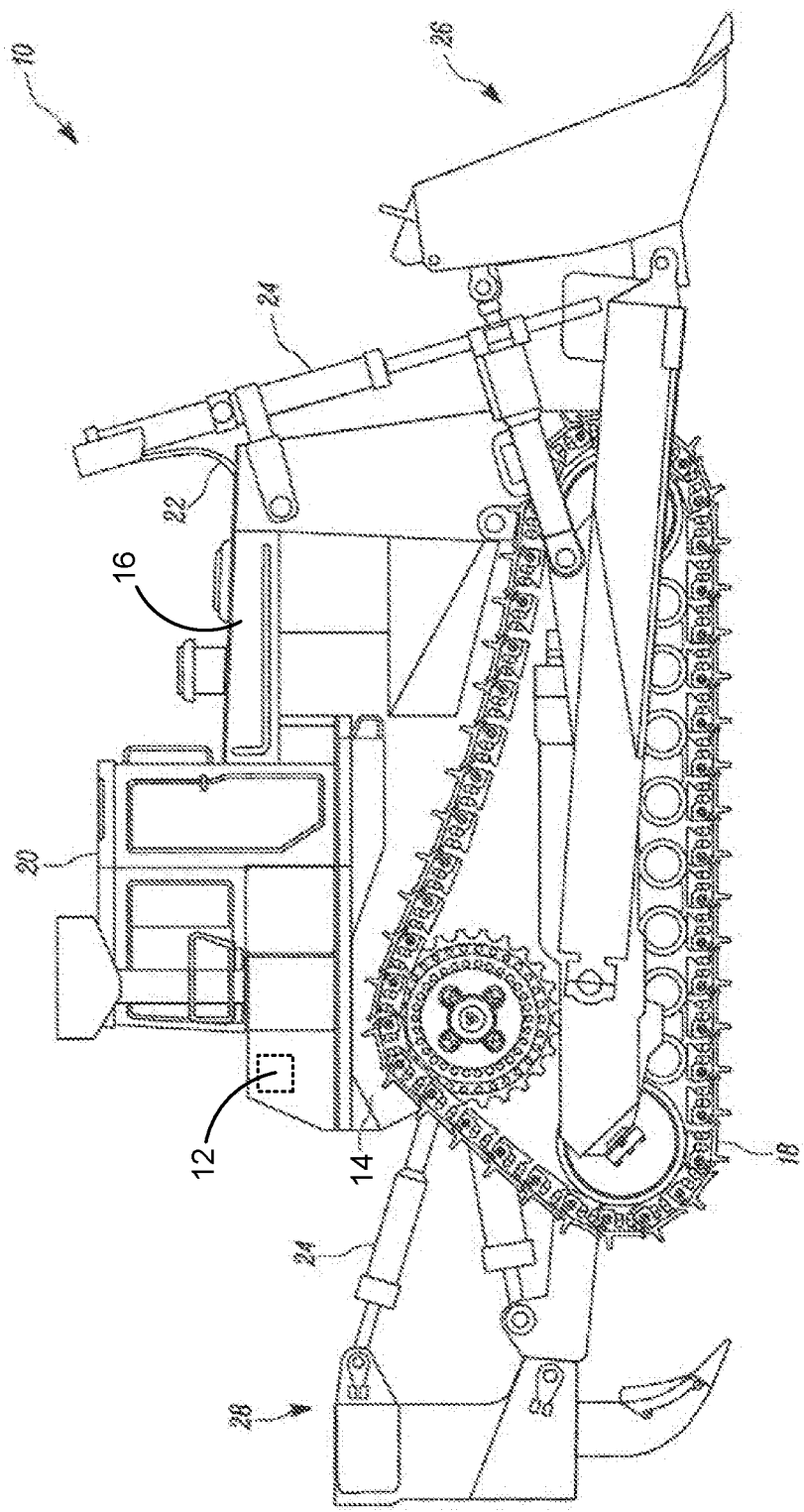
FIG. 1 is a diagram of an example machine described herein.

FIG. 1 is a diagram of an example machine 10 that includes a controller 12. As shown in FIG. 1, the machine 10 is embodied as a track type machine, such as a track type tractor. Alternatively, the machine 10 may be a backhoe loader, a skid steer loader, a wheel loader, a motor grader, an excavator, a scraper, an agricultural tractor, a haul truck, or the like.

As shown in FIG. 1, the machine 10 may include a frame assembly 14 and a power source 16. The power source 16 may include one or more batteries, one or more engines (e.g., diesel engines), one or more generators, and/or the like, configured to provide power to the machine 10. For example, the power source 16 may provide power to a motor (not shown in FIG. 1) of the machine 10, such as an electric motor. The motor may be associated with an electric drive system of the machine 10 and/or a continuously variable transmission of the machine 10.

The machine 10 may also include a set of ground engaging members 18, such as wheels, tracks, rollers, or the like, for propelling the machine 10. Furthermore, the machine 10 may include an operator cabin 20, which may include one or more input devices (not shown in FIG. 1), such as one or more push-buttons, control levers, steering wheels, or the like, for controlling and/or monitoring operations of the machine 10.

In some implementations, the machine 10 may include a hydraulic pump (not shown). The hydraulic pump may be operatively coupled to the power source 16 to provide pressurized hydraulic fluid via hoses 22 to hydraulic cylinders 24 for moving tools and implements of the machine 10, such as a front attachment 26 and/or a rear attachment 28. The front attachment 26 may include a blade assembly, and/or the like. The rear attachment 28 may include a ripper assembly, a winch assembly, a drawbar assembly, and/or the like.

Moreover, the machine 10 may include a braking system (not shown in FIG. 1) configured to slow and/or arrest a movement of the machine 10. The braking system may include one or more brakes, such as one or more friction brakes (i.e., mechanical brakes). A friction brake may include a friction component (e.g., a friction disc, a friction plate, a brake pad, and/or the like) that applies friction to a moving part (e.g., a wheel, a track wheel, a motor, and/or the like) of the machine 10.

In some cases, the machine 10 may include a dual electric drive system that includes a first motor (e.g., for powering a left side of the machine 10) and a second motor (e.g., for powering a right side of the machine 10). In such cases, the first motor may be associated with a first brake and the second motor may be associated with a second brake.

The controller 12 (e.g., an electronic control module (ECM)) may include one or more memories and one or more processors that implement operations associated with brake power derating, as described below in connection with FIG. 2. For example, the controller 12 may be configured to determine a power limit for the brakes based on a temperature of the brakes during engagement of the brakes according to a commanded power, determine a speed adjustment for the machine based on the power limit and the commanded power, and cause adjustment to a speed of the machine based on the determined speed adjustment.

As indicated above, FIG. 1 is provided as an example. Other examples may differ from what is described in connection with FIG. 1.

Figure 2:
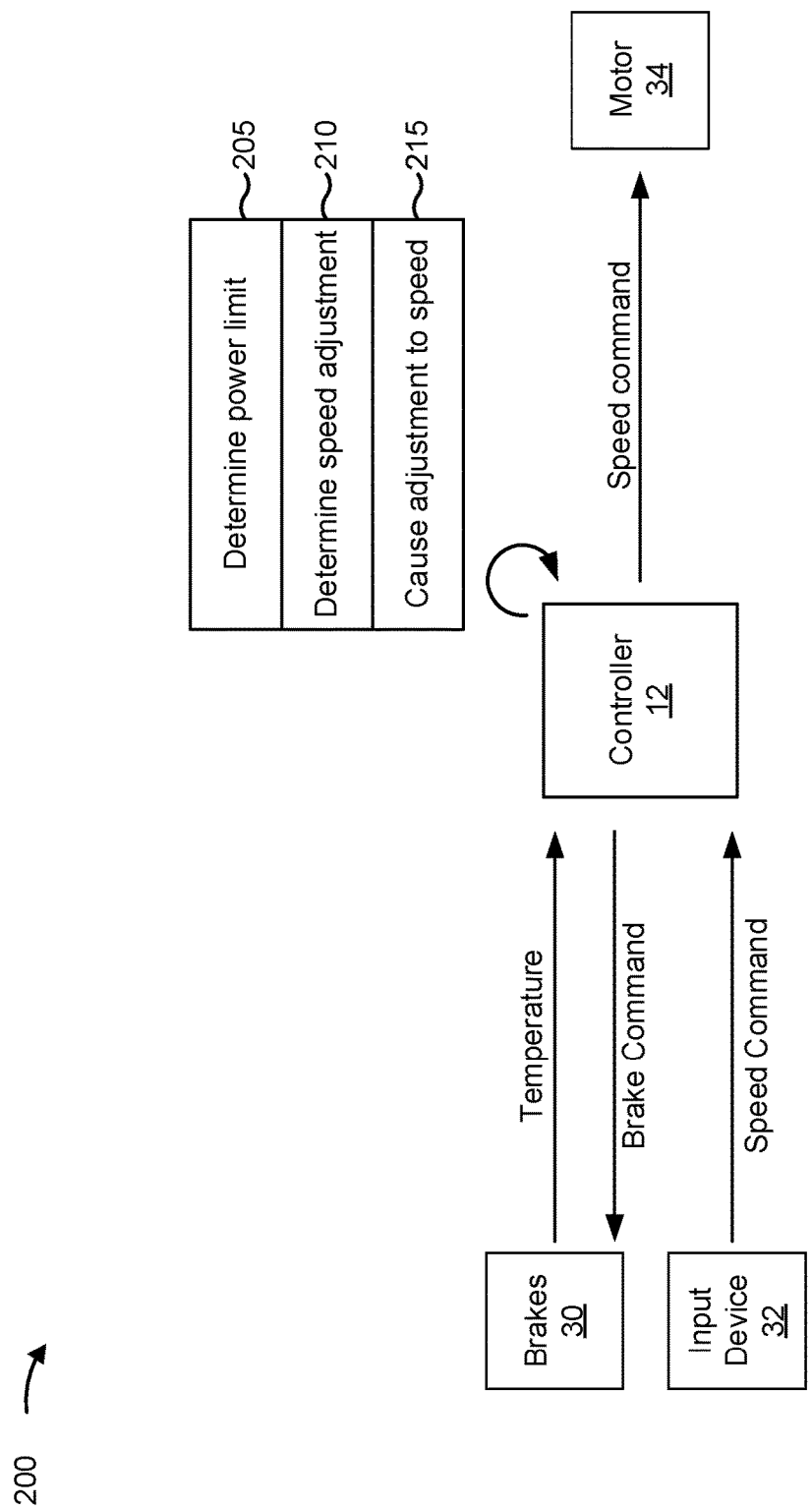
FIG. 2 is a diagram of an example implementation described herein.

FIG. 2 is a diagram of an example implementation 200 described herein. As shown in FIG. 2, example implementation 200 may relate to a braking system of the machine 10 that includes a controller 12, one or more brakes 30, an input device 32, and one or more motors 34, as described above in connection with FIG. 1. For example, the brakes 30 may be friction brakes that generate heat when engaged with a moving part of the machine 10.

As shown in FIG. 2, the controller 12 may receive information relating to a temperature of the brakes 30. For example, the controller 12 may receive information relating to the temperature from one or more temperature sensors associated with the brakes 30. Additionally, or alternatively, the controller 12 may determine an estimated temperature for the one or more brakes. For example, the controller 12 may determine the estimated temperature based on a state observer model (e.g., a state observer model associated with a power plant of the machine 10). The temperature of the brakes 30, whether an actual temperature detected by sensors or an estimated temperature, may relate to temperatures at friction components of the brakes 30 (e.g., an average of the temperatures at the friction components, a highest of the temperatures at the friction components, and/or the like). In some implementations, the temperature of the brakes 30 may relate to a temperature of another component of the brakes 30, a temperature of an oil of the brakes 30, and/or the like.

The controller 12 also may receive information relating to one or more operator commands provided by an operator of the machine 10 (e.g., via the input device 32). For example, an operator command may command a particular speed for the machine 10 and/or the motor 34. Based on the commanded speed, the controller 12 may cause movement of the machine 10 at the commanded speed. In some cases, while moving at the commanded speed, the machine 10 may travel down a grade (e.g., downhill), which may be detected by controller 12 based on inclinometer data and/or an increase in the machine's speed without a corresponding operator command to increase speed. In such cases, the controller 12 may transmit (e.g., automatically, such as without an operator command) a brake command to the brakes 30 in order to maintain the speed of the machine 10 at the commanded speed while traveling downhill. The brake command may command engagement of the brakes 30 at a particular torque (e.g., a particular torque that maintains the speed of the machine 10 at the commanded speed).

As shown in FIG. 2, and by reference number 205, the controller 12 may determine a power limit for the brakes. For example, the controller 12 may determine the power limit during engagement of the brakes 30 at a commanded power (e.g., a power dissipated at the brakes 30 that is a product of the commanded brake torque and a brake speed, which corresponds to the speed of the machine 10). That is, a commanded power may be determined that is to maintain the speed of the machine 10 at a commanded speed while the machine 10 is traveling downhill, as described above. As described above, the commanded power for engagement of the brakes 30 may cause a temperature of the brakes 30 (e.g., a temperature of one or more friction components of the brakes 30) to increase. Accordingly, the power limit may represent a power at which the temperature of the brakes 30 will cease to increase. Additionally, or alternatively, the power limit may represent a power at which the temperature of the brakes 30 will decrease to a threshold temperature.

The controller 12 may determine the power limit based on the temperature of the brakes 30. In other words, the controller 12 may determine the power limit as a function of the temperature. Accordingly, as the temperature increases the determined power limit may decrease, and as the temperature decreases the determined power limit may increase. The controller 12 may determine the power limit at regular intervals or at irregular intervals (e.g., when the temperature satisfies a threshold value, when the temperature is within a threshold range, and/or the like).

The controller 12 may determine the power limit based on the temperature according to heat transfer characteristics of the brakes 30. For example, the heat transfer characteristics of the brakes 30 may relate to heat transfer properties of friction components of the brakes 30, hydraulic fluids of the brakes 30, oil or other lubricants of the brakes 30, and/or the like, which may be correlated to a particular configuration or design of the brakes 30. Accordingly, based on the heat transfer characteristics of the brakes 30, the controller 12 may determine that a particular power level is associated with a particular temperature (e.g., a particular maximum temperature) of the brakes 30. In such a case, the controller 12 may use a brake temperature model and/or empirical brake temperature data to determine a particular power level that is associated with a particular temperature.

As shown by reference number 210, the controller 12 may determine a speed adjustment to a speed of the machine 10 and/or a speed of the motor 34. For example, the controller 12 may determine the speed adjustment based on a determination that the commanded power (e.g., that is to maintain the speed of the machine 10 at a commanded speed while the machine 10 is traveling downhill) satisfies (e.g., equals or exceeds) the determined power limit. Moreover, the controller 12 may determine the speed adjustment based on the determined power limit. For example, the controller 12 may determine the speed adjustment based on the determined power limit and the commanded power (e.g., commanded brake torque×brake speed) of the brakes 30.

In such a case, the controller 12 may determine the speed adjustment as a difference between the determined power limit and the commanded power. Thus, the determined speed adjustment may increase as the difference between the determined power limit and the commanded power increases. In some implementations, the controller 12 may process the difference between the determined power limit and the commanded power using a proportional-integral-derivative (PID) controller of the controller 12. That is, the controller 12 may provide the difference as an input to the PID controller, and the PID controller may provide the speed adjustment as an output.

As described above, in some cases, the machine 10 may include a first brake 30 associated with a first motor 34 and a second brake 30 associated with a second motor 34. In such a case, the first brake 30 may be engaged (e.g., while the machine 10 is traveling downhill) at a first commanded power and the second brake 30 may be engaged at a second commanded power. Accordingly, a first difference between the power limit and the first commanded power may be unequal to a second difference between the power limit and the second commanded power. In such a case, the controller 12 may determine the speed adjustment based on a greater of the first difference and the second difference. For example, the controller 12 may process the first difference with a PID controller to obtain a first speed adjustment, process the second difference with a PID controller to obtain a second speed adjustment, and determine the speed adjustment as a greater of the first speed adjustment and the second speed adjustment.

As shown by reference number 215, the controller 12 may cause adjustment to the speed of the machine 10, via the motor 34 and/or a transmission associated with the motor 34, based on the determined speed adjustment. For example, the controller 12 may transmit a command to the motor 34, and/or a transmission associated with the motor 34, to cause adjustment to the speed of the machine 10. The command may be a speed command that identifies a new speed for the machine 10, the motor 34, and/or the transmission, based on the determined speed adjustment. In response to the speed command, the motor 34 and/or the transmission may operate at the new speed (or cause the machine 10 to operate at the new speed), thereby reducing a power (e.g., brake torque× brake speed) of the brakes 30 to the determined power limit.

The controller 12 may determine the new speed as a difference between a maximum permissible speed of the machine 10 and/or the motor 34 and the determined speed adjustment. The maximum permissible speed may be a fixed value that is defined in order to prevent damage and/or excessive wear to the machine 10. In some cases, the controller 12 may not transmit the speed command identifying the new speed when the new speed is greater than a commanded speed by the operator of the machine 10. In such cases, the speed command may identify the operator commanded speed.

As indicated above, FIG. 2 is provided as an example. Other examples may differ from what is described in connection with FIG. 2.

Figure 3:
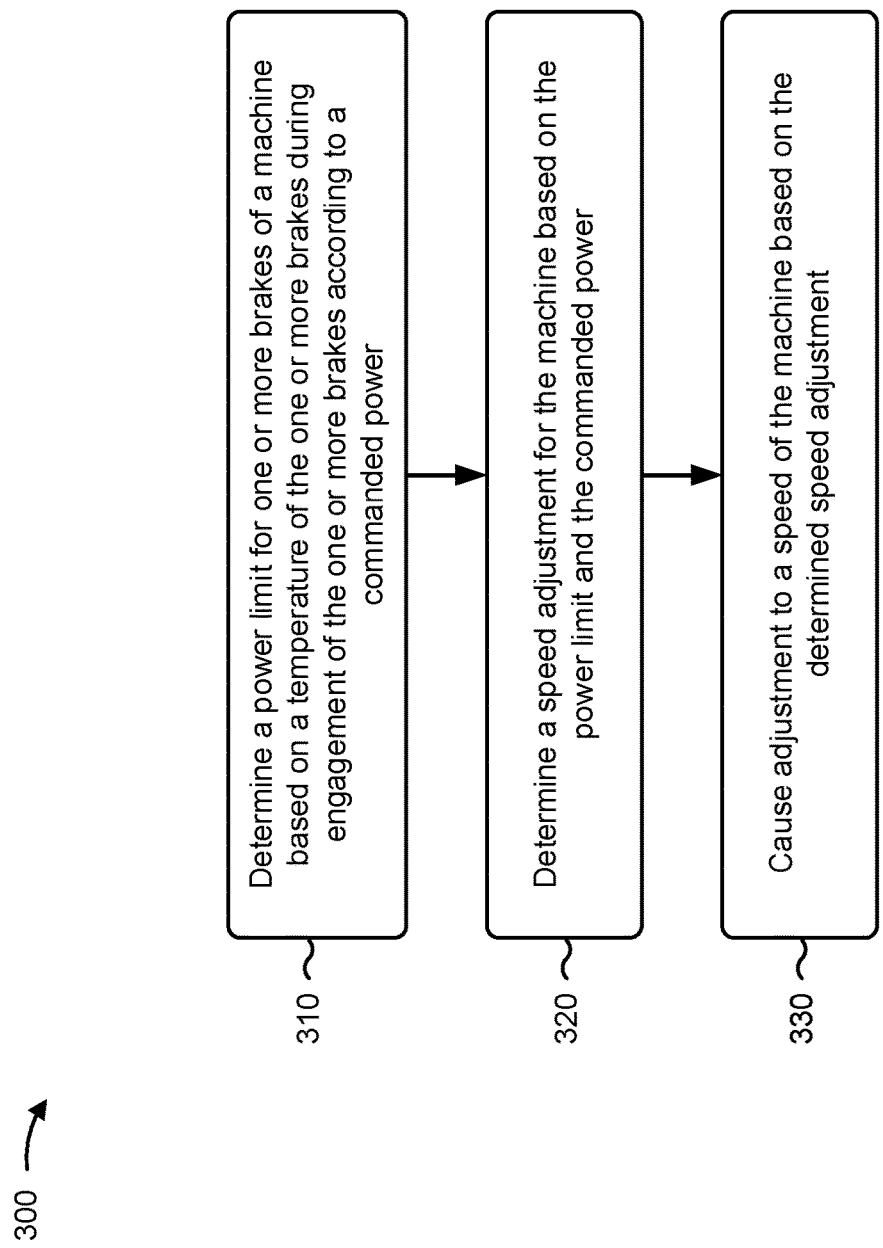
FIG. 3 is a flow chart of an example process for brake power derating.

FIG. 3 is a flow chart of an example process 300 for brake power derating. One or more process blocks of FIG. 3 may be performed by a controller (e.g., controller 12). Additionally, or alternatively, one or more process blocks of FIG. 3 may be performed by another device or a group of devices separate from or including the controller, such as another device or component that is internal or external to the machine 10.

As shown in FIG. 3, process 300 may include determining a power limit for one or more brakes of a machine based on a temperature of the one or more brakes during engagement of the one or more brakes according to a commanded power (block 310). For example, the controller (e.g., using a processor, a memory, and/or the like) may determine a power limit for one or more brakes of a machine based on a temperature of the one or more brakes during engagement of the one or more brakes according to a commanded power, as described above. The power limit may be a power at which the temperature of the one or more brakes ceases to increase.

The temperature of the one or more brakes may be an estimated value based on a state observer model. Additionally, or alternatively, process 300 may further include obtaining information relating to the temperature from one or more temperature sensors associated with the one or more brakes. The temperature may be of one or more friction components of the one or more brakes.

As further shown in FIG. 3, process 300 may include determining a speed adjustment for the machine based on the power limit and the commanded power (block 320). For example, the controller (e.g., using a processor, a memory, and/or the like) may determine a speed adjustment for the machine based on the power limit and the commanded power, as described above.

The speed adjustment may be determined based on a determination that the commanded power satisfies the power limit. In addition, the speed adjustment may be determined based on a difference between the power limit and the commanded power. In some cases, the difference may be processed with a PID controller in order to determine the speed adjustment.

In some implementations, the machine may include one or more motors and a first motor of the one or more motors may be associated with a first brake of the one or more brakes, and a second motor of the one or more motors may be associated with a second brake of the one or more brakes. In such a case, the speed adjustment may be determined based on a greater of a first difference between the power limit and a first commanded power for the engagement of the first brake and a second difference between the power limit and a second commanded power for the engagement of the second brake.

As further shown in FIG. 3, process 300 may include causing adjustment to a speed of the machine based on the determined speed adjustment (block 330). For example, the controller (e.g., using a processor, a memory, an output component, a communication interface, and/or the like) may cause adjustment to a speed of the machine based on the determined speed adjustment, as described above. The speed of the machine may be controlled by a continuously variable transmission.

Causing adjustment to the speed of the machine may include transmitting a command to adjust the speed of the machine according to the determined speed adjustment. The speed of the machine may be adjusted to a value that is a difference between a maximum permissible speed of the machine and the determined speed adjustment. For example, the speed of the machine may be adjusted when the value is less than an operator commanded speed of the machine.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The disclosed braking system may be used with any machine for which brake power derating is desired. In particular, the disclosed braking system may be used with a machine that may engage (e.g., automatically engage) one or more brakes of the machine when traveling downhill in order to maintain a commanded speed of the machine. In some cases, engagement of the brakes may generate a temperature sufficient to damage the brakes or cause brake failure. The disclosed braking system may use the temperature generated by engagement of the brakes to determine a braking power limit below which the temperature of the brakes ceases to increase due to the engagement. In this way, the disclosed braking system enables determination of an accurate brake power limit that minimizes brake power derating while reducing wear to the brakes and improving the useful life of the brakes.

What is claimed is:

1. A method, comprising:
determining a power limit for one or more brakes of a machine based on a temperature of the one or more brakes during engagement of the one or more brakes according to a commanded power,
the power limit being a power at which the temperature of the one or more brakes ceases to increase;
determining a speed adjustment to a speed of the machine based on the power limit and the commanded power; and
causing adjustment to the speed of the machine based on the determined speed adjustment.

2. The method of claim 1, wherein the speed adjustment is determined based on a difference between the power limit and the commanded power.

3. The method of claim 2, wherein the difference is processed with a proportional-integral-derivative controller in order to determine the speed adjustment.

4. The method of claim 1, wherein the temperature of the one or more brakes is an estimated value based on a state observer model.

5. The method of claim 1, further comprising obtaining information relating to the temperature from one or more temperature sensors associated with the one or more brakes.

6. The method of claim 1, wherein the temperature is of one or more friction components of the one or more brakes.

7. The method of claim 1, wherein the speed adjustment is determined based on a determination that the commanded power satisfies the power limit.

8. The method of claim 1, wherein causing adjustment to the speed of the machine comprises transmitting a command to adjust the speed of the machine according to the determined speed adjustment.

9. A braking system, comprising:
one or more brakes of a machine; and
a controller configured to:
determine a power limit for the one or more brakes based on a temperature of the one or more brakes during engagement of the one or more brakes according to a commanded power,
the power limit being a power at which the temperature of the one or more brakes ceases to increase;
determine a speed adjustment to a speed of the machine based on the power limit and the commanded power; and
cause adjustment to the speed of the machine based on the determined speed adjustment.

10. The braking system of claim 9, wherein the speed adjustment is determined based on a difference between the power limit and the commanded power.

11. The braking system of claim 9, wherein the speed of the machine is adjusted to a value that is a difference between a maximum permissible speed of the machine and the determined speed adjustment.

12. The braking system of claim 11, wherein the speed of the machine is adjusted when the value is less than an operator commanded speed of the machine.

13. The braking system of claim 9, wherein the speed of the machine is controlled by a continuously variable transmission.

14. The braking system of claim 9, wherein the temperature is of one or more friction components of the one or more brakes.

15. A machine, comprising:
one or more motors;
one or more brakes; and
a controller configured to:
determine a power limit for the one or more brakes based on a temperature of the one or more brakes during engagement of the one or more brakes,
the power limit being a power at which the temperature of the one or more brakes ceases to increase;
determine a speed adjustment to a speed of the machine based on the power limit; and
cause adjustment to the speed of the machine based on the determined speed adjustment.

16. The machine of claim 15, wherein the speed adjustment is determined based on the power limit and a commanded power for the engagement of the one or more brakes.

17. The machine of claim 16, wherein the speed adjustment is determined based on a difference between the power limit and the commanded power.

18. The machine of claim 15, wherein the temperature is of one or more friction components of the one or more brakes.

19. The machine of claim 15, wherein the speed of the machine is controlled by a continuously variable transmission.

20. The machine of claim 15, wherein a first motor of the one or more motors is associated with a first brake of the one or more brakes, and a second motor of the one or more motors is associated with a second brake of the one or more brakes, and
wherein the speed adjustment is determined based on a greater of a first difference between the power limit and a first commanded power for the engagement of the first brake and a second difference between the power limit and a second commanded power for the engagement of the second brake.

* * * * *